United States Patent
Sinzel et al.

(10) Patent No.: US 12,512,544 B2
(45) Date of Patent: Dec. 30, 2025

(54) TOLERANCE COMPENSATION ARRANGEMENT, BATTERY AND METHOD FOR PROVIDING TOLERANCE COMPENSATION

(71) Applicant: AUDI AG, Ingolstadt (DE)

(72) Inventors: Steffen Sinzel, Weinsberg (DE); Dirk Hoefner, Wellheim (DE); Alexander Loefflath, Neuenstadt (DE)

(73) Assignee: AUDI AG, Ingolstadt (DE)

( * ) Notice: Subject to any disclaimer, the term of this patent is extended or adjusted under 35 U.S.C. 154(b) by 610 days.

(21) Appl. No.: 17/986,068

(22) Filed: Nov. 14, 2022

(65) Prior Publication Data
US 2023/0155234 A1    May 18, 2023

(30) Foreign Application Priority Data
Nov. 16, 2021    (DE) .......................... 102021129784.2

(51) Int. Cl.
| | |
|---|---|
| *H01M 50/242* | (2021.01) |
| *H01M 50/202* | (2021.01) |
| *H01M 50/204* | (2021.01) |
| *H01M 50/262* | (2021.01) |

(52) U.S. Cl.
CPC ....... *H01M 50/242* (2021.01); *H01M 50/202* (2021.01); *H01M 50/204* (2021.01); *H01M 50/262* (2021.01)

(58) Field of Classification Search
USPC ........................................................ 411/546
See application file for complete search history.

(56) References Cited

U.S. PATENT DOCUMENTS

| | | | |
|---|---|---|---|
| 9,302,716 B2 * | 4/2016 | Sahi ........................ | F16B 5/025 |
| 10,145,399 B2 * | 12/2018 | Haselberger .............. | F16B 5/01 |
| 2017/0346142 A1 * | 11/2017 | Landerer ............. | H01M 50/202 |

FOREIGN PATENT DOCUMENTS

| | | |
|---|---|---|
| DE | 19949654 A1 | 4/2001 |
| DE | 10151383 A1 | 4/2003 |
| DE | 102007007956 A1 | 8/2008 |

(Continued)

OTHER PUBLICATIONS

Machine Translation of DE-202010002447-U1 (Year: 2010).*

(Continued)

*Primary Examiner* — Gregg Cantelmo
(74) *Attorney, Agent, or Firm* — Maier & Maier, PLLC

(57) ABSTRACT

A tolerance compensation arrangement for tolerance compensation between a first component and a second component to be fastened to the first component, the tolerance compensation arrangement having a tolerance compensation unit, a base element for fastening to the first component, a compensation element which can be accommodated in the base element, and a first through-opening extending in a first direction through the base element and through the compensation element accommodated in the base element. The tolerance compensation arrangement has a nut for fastening to the second component. The tolerance compensation unit is designed in such a way that by screwing a specific screw, the screw neck of which is passed through the first through-opening of the tolerance compensation unit, into the nut in a screwing-in direction.

15 Claims, 2 Drawing Sheets

(56) References Cited

FOREIGN PATENT DOCUMENTS

| | | |
|---|---|---|
| DE | 202008011318 U1 | 12/2008 |
| DE | 202010002447 U1 | 7/2010 |
| DE | 102016222094 A1 | 5/2018 |
| DE | 102019211723 A1 | 2/2021 |
| EP | 1731772 A2 | 12/2006 |
| WO | WO-2004040150 A1 * 5/2004 ............. F16B 5/025 |
| WO | 2016184620 A1 | 11/2016 |

OTHER PUBLICATIONS

Examination Report issued on Jun. 17, 2022, in connection with corresponding German Application No. 102021129784.2 (10 pp., including machine-generated English translation).

* cited by examiner

TOLERANCE COMPENSATION ARRANGEMENT, BATTERY AND METHOD FOR PROVIDING TOLERANCE COMPENSATION

FIELD

The invention relates to a tolerance compensation arrangement for tolerance compensation between a first component and a second component to be fastened to the first component, wherein the tolerance compensation arrangement has a tolerance compensation unit which comprises a base element for fastening to the first component, a compensation element with a support surface, wherein the compensation element can be accommodated in the base element and is adjustable in its position relative to the base element with respect to a first direction, as well as a first through-opening which extends in the first direction through the base element and through the compensation element accommodated in the base element, through which through-opening a screw neck of a specific screw can be passed. The tolerance compensation unit is also designed in such a way that rotating the specific screw with its screw neck guided through the first through-opening causes the compensation element to move relative to the base element with respect to the first direction, so that a distance between the base element and the support surface of the compensation element increases. Furthermore, the invention also relates to a battery with such a tolerance compensation arrangement and a method for providing tolerance compensation.

BACKGROUND

In today's electric cars, individual battery modules of a motor vehicle battery, in particular a high-voltage battery, are firmly anchored in the battery housing. Ideally, the connection should remain detachable for a service life of around twelve years. Since the battery housing consists of ribs and compartments, namely has numerous separating webs that separate the individual compartments for accommodating the battery modules, installing the battery modules is not a trivial task. In addition, a heat-conducting medium, for example a so called gap filler or gap pad, is usually applied into the battery housing between the compartments, in particular the compartment bottom, and the battery modules, for heat dissipation. This heat-conducting medium for heat dissipation is very advantageous for the function of the battery modules over the service life. Since a battery housing has very large dimensions, for example a size of 2 meters by 1.6 meters, there are usually significantly different tolerances per compartment when the battery modules are inserted into the individual compartments. In particular, this creates a gap between the compartment bottom and the battery module, which accordingly can be of different sizes. The battery modules are screwed together on above mentioned ribs. The gap between the compartment bottom and the battery module is compensated by the heat-conducting medium in order to be able to generate proper heat dissipation. The disadvantage in this case is that a large quantity of the heat-conducting medium has to be applied in order to be able to compensate for these different tolerances, wherein the heat-conducting medium is very expensive. In addition, air pockets due to the application of large quantities of the heat-conducting medium can have a negative effect on operation. In addition, it is not possible to use heat-conducting pads if there are large tolerances between the battery compartment bottom and the battery module. It would therefore be advantageous to be able to insert the battery module into the battery housing in such a way that there is as small a gap as possible between the battery module and the compartment bottom, and instead to compensate for the tolerances when screwing a battery module to the ribs or, in general, to the battery housing.

A traction battery with a tolerance compensation unit, with which this task can be accomplished, is described in DE 10 2019 211 723 A1, for example. Thanks to the tolerance compensation system, the battery modules can be screwed together despite tolerances between the battery housing and the battery module.

Other tolerance compensation systems are described, for example, in DE 20 2008 011 318 U1, EP 1 731 772 A2, DE 10 2016 222 094 A1 and DE 101 51 383 A1. In principle, tolerance compensation in the screwing direction can be achieved with all of these tolerance compensation systems. These are all based on the similar mode of operation, according to which, for example, such a tolerance compensation system has a base element and a compensation element that is stroke-adjustable relative to the base element. For example, the base element can be fastened to a first component, while a screw is then inserted through a second component and screwed into the tolerance compensation system arranged on the first component, whereby the compensation element is moved against the screwing direction with respect to the base element, until it finally abuts against the second component.

A further challenge consists in being able to arrange such a tolerance compensation system as simply as possible on at least one of the components to be fastened together, which is difficult due to the cramped installation space situation in a battery. In DE 10 2019 211 723 A1, already mentioned above, the tolerance compensation unit is pushed onto a fastening flange on the battery housing, in particular on a partition wall or side wall of the battery housing. This pushing mechanism allows the tolerance compensation unit to be fastened in a very simple manner. However, this requires an additional base body, which in turn requires additional installation space, which is why supporting surfaces and contact surfaces have to be dimensioned smaller, as a result of which the maximum achievable biasing forces are limited.

SUMMARY

The object of the present invention is therefore to provide a tolerance compensation arrangement, a battery and a method which enable tolerance compensation between two components and the provision of the greatest possible biasing forces in the simplest manner possible and in the most space-efficient manner possible.

The invention relates to a tolerance compensation arrangement for tolerance compensation between a first component and a second component to be fastened to the first component, wherein the tolerance compensation arrangement has a tolerance compensation unit which comprises a base element for fastening to the first component, a compensation element with a support surface, wherein the compensation element is receivable in the base element and is adjustable in its position relative to the base element with respect to a first direction, and a first through-opening which extends in the first direction through the base element and through the compensation element accommodated in the base element, through which through-opening a screw neck of a specific screw can be passed. The tolerance compensation unit is also designed in such a way that rotating the specific screw with its screw neck guided through the first through-opening causes the compensation element to move relative to the base element with respect to the first direction, so that a distance between the base element and the support surface of the compensation element increases. Furthermore, the tolerance compensation arrangement has a nut, which is separate from the tolerance compensation unit, for fastening to the second component and into which the specific screw can be screwed, wherein the tolerance compensation unit is set up in such a way that by screwing-in the specific screw, which has its screw neck passed through the first through-opening of the tolerance compensation unit, into the nut in a screwing-in direction that corresponds to the first direction, the compensation element can also be moved in the first direction relative to the base element.

Accordingly, the tolerance compensation arrangement has two fundamental differences from conventional tolerance compensation systems. On the one hand, the nut, into which the specific screw is screwed when fastening the two components to one another, and the tolerance compensation unit are provided for arrangement on different components, namely the tolerance compensation unit for fastening to the first component and the nut for fastening to the second component. In addition, the compensation element is not moved relative to the base element, as is usual, against the screwing-in direction, but in the screwing-in direction. Using the example of the battery described above, due to the separate design and arrangement of the nut from the tolerance compensation unit, it is now possible, for example, to arrange the tolerance compensation unit on the battery module instead of on the battery housing flange, as is usually the case. Thus, only the nut has to be arranged or fastened on the battery housing flange. This is much easier to implement due to the limited installation space present in a battery housing. In particular, in this case, a separate receptacle for accommodating the tolerance compensation unit, in order to also fasten it to the battery housing flange, can be dispensed with. The tolerance compensation unit can, for example, be fastened with the base element directly to a corresponding fastening portion of the battery module. This turns out to be very simple, especially when the battery module is not yet arranged in the battery housing. The tolerance compensation unit can therefore be preassembled very easily before inserting a battery module into the battery housing, or it can be generally preassembled on the first component before arranging the first component on the second component. By dispensing with such an additional receptacle, which was also initially referred to as a base body, significantly more installation space is available for enlarging the contact surfaces, for example the support surface of the compensation element, which in turn allows significantly greater biasing forces. A tolerance compensation unit can thus be provided in a simple manner, which unit enables tolerance compensation in the screwing direction in a particularly space-saving, efficient and simple manner.

The tolerance compensation arrangement described within the scope of the invention is particularly well suited to compensating for tolerances within a battery, in particular a high-voltage battery, of a motor vehicle, in particular between a battery module as the first component and a battery housing as the second component. Nevertheless, the tolerance compensation arrangement can generally also be used to compensate for tolerances between components other than the first and second components. Such a first and second component does not necessarily has to be part of a battery, but can in principle be any other component, preferably a motor vehicle component. For example, the tolerance compensation arrangement can also be used in the area of headlight adjustment, dashboard adjustment and roof rails. Accordingly, the first and/or second component can be, for example, a headlight component or a dashboard component or a roof rail component. Applications outside the automotive sector are also conceivable. Although the invention and its exemplary embodiments are illustrated and explained below primarily using the example of battery components as the first and second component, the invention and its exemplary embodiments should not be interpreted as being limited to this preferred application.

The compensation element can, for example, be accommodated in the base element in such a way that it can be screwed into the base element. The base element can accordingly have a through-opening with an internal thread and the compensation element can be provided with a corresponding external thread so that the compensation element can be easily screwed into the base element and can then be unscrewed from it. The compensation element can also be completely detachable from the base element, for example, by unscrewing it. The compensation element is also provided with a through-opening. A driver unit can in turn be arranged in this opening, for example, which makes it possible to rotate the compensation element by rotating the screw when its screw neck is inserted through the tolerance compensation unit. This driver unit can also be provided with a through-opening. The through-openings in the base element, the compensating unit and the driver unit are aligned concentrically to one another and, for example, coaxially to a defined axis of rotation of the tolerance compensation unit and of the screw passing there-through. In particular, the through-opening in the driver unit is designed in such a way that the screw neck can be pushed through it without having to rotate the screw, namely by a purely translational insertion movement, while in the case of a rotary movement of the screw via this driver unit, for example by frictional engagement, a torque is transmitted from the screw to the compensation element. The thread of the screw, the external thread of the compensation element and the internal thread of the base element are designed in such a way that by screwing-in the screw into the nut in the screwing-in direction, an at least partial unscrewing of the compensation element from the base element is achieved, also in the same first direction, namely in the screwing-in direction of the screw, while the base element itself remains stationary with respect to the first component. The driver unit can, for example, comprise a spring which brings about a tensioning while generating a certain pretensioning force.

The base element can be arranged on the first component in a wide variety of ways, for example, it can be welded, clipped in or snapped in, or it can be arranged on the first component by some other mechanical fastening option. An integral design of the first component with the base element is also conceivable. It can also be provided that the base element has an external thread, via which it can be screwed into the first component. For example, the base element can also be pressed into an opening in the first component. Basically, any type of non-positive connection and/or form-fitting and/or material connection between the first component and the base element in question can be used. The same applies in a corresponding manner to the arrangement of the nut on the second component. In this case, the base element is preferably arranged or can be arranged fixedly on the first component and the nut on the second component, in particular also in a non-rotatable manner. In addition, it is preferred that only materials other than plastics are used to provide the tolerance compensation arrangement. For example, the tolerance compensation arrangement is made of metallic materials.

In an advantageous embodiment of the invention, the tolerance compensation arrangement is designed in such a way that when the screw, which has its screw neck passed through the first through-opening of the tolerance compensation unit, is screwed into the nut, the compensation element can be moved in the first direction relative to the base element until the support surface of the compensation element reaches an abutment, which is particularly provided by the nut. However, it is also conceivable that the abutment is provided, for example, by a part of the second component on which the nut is arranged. In other words, when the screw is screwed into the nut, the compensation element is unscrewed until finally the support surface of the compensation element comes to rest against the abutment, which is fixed in relation to the second component. This advantageously results in a hard screw connection when, for example, the screw abuts head-on against the first component or another contact element that is fixed in relation to the first component. Ultimately, screwing can be advantageously performed up to a certain torque until a firm bond is formed between the two components.

The support surface of the compensation element can also be provided, for example, by a support plate of the tolerance compensation element. This offers a particularly large support surface and therefore also allows very high biasing forces.

In a further advantageous embodiment of the invention, the tolerance compensation arrangement includes the specific screw, which includes a screw neck with an external thread and a screw head that is widened compared to the screw neck. The dimensions of the internal thread of the nut and the external thread of the screw are adapted to each other so that the screw can be screwed into the nut. Correspondingly, an outer diameter of the screw neck, in particular of the external thread, is dimensioned in such a way that the screw neck can be inserted through the first through-opening. The widened screw head advantageously creates an additional abutment option that can be used to define an end position of the screw.

In a further advantageous embodiment of the invention, the tolerance compensation arrangement includes the first component, which has a first fastening portion with a first side and a second side opposite the first side with respect to the first direction, and a second through-opening from the first side to the second side. The through-opening has a first diameter that is smaller than a second diameter of the screw head, wherein the base element is arranged on the second side of the fastening portion, and the screw can be inserted, with its screw neck, without any rotating movement, through the second through-opening of the fastening portion and through the first through-opening of the tolerance compensation unit, that is, according to a purely translational movement in the first direction, so that the fastening portion is located between the screw head and the tolerance compensation unit. The tolerance compensation unit can therefore be arranged, for example, on the underside of the first fastening portion of the first component and the screw can then be passed through this first fastening portion from above, through the tolerance compensation unit, in particular until the screw head comes to rest on the upper side of the first fastening portion. However, this is only happens when the screw has been screwed up to its end position in the nut arranged on the second component. Such an arrangement can be implemented particularly easily on a battery module, for example. For example, the first fastening portion can be provided as a corresponding portion of a module housing. The tolerance compensation unit can be easily preassembled on this first fastening portion. The entire battery module can then be inserted into the battery housing, which then represents the second component and is provided, for example, with a fastening flange on which the nut is arranged. The screw can then simply be inserted through the first and second through-opening from above until the end of the screw opposite the screw head reaches the internal thread of the nut. The screw can then be screwed into the nut, as a result of which the compensation element moves downwards in the screwing direction until it comes to rest on the nut, which ultimately provides a hard screw joint.

Accordingly, a very advantageous embodiment of the invention is provided in which the tolerance compensation arrangement comprises the second component, which has a second fastening portion to which the nut is fastened, so that the screw, the neck of which is inserted through the first and second through-opening, can be screwed into the nut. The first and the second component are then arranged correspondingly to one another in such a way that the through-opening in the nut providing the internal thread of the nut and the first and second through-opening are aligned coaxially to one another. The second fastening portion can then correspond to the already mentioned fastening flange on a battery housing. The nut can in turn be fastened to this second fastening portion in a wide variety of ways, for example it can also be formed integral with this fastening portion, or it can be pressed in, clipped in, screwed on or welded in, or the like. In this case, too, any form-fitting, force-fitting or material-fitting connection between the nut and the second fastening portion can be considered.

In a further advantageous embodiment, the nut is designed as a nut pressed into the second fastening portion. This allows a particularly simple design. In particular, it is thus advantageously possible to manufacture the nut and the second fastening portion as separate components. This allows significantly more flexibility in the possible applications. The second fastening portion then only has to be provided with an opening into which the nut can be pressed. This can be implemented very easily in terms of manufacturing technology.

It has been shown to be particularly advantageous if the nut has an internally threaded portion with an internal thread and a flange portion which is directly adjacent to the internally threaded portion in the first direction and has an external geometry which is wider than the internally threaded portion. It is also preferred that the second fastening portion has an opening into which the nut is pressed in such a way that the flange portion is brought to rest on a side of the second fastening portion that faces away from the tolerance compensation unit, and in particular a part of the internally threaded portion is passed through the opening and protrudes against the first direction beyond the second fastening portion. The flange portion of the nut can advantageously ensure that the nut cannot be moved out of the opening in the second fastening portion against the first direction. This is advantageous because in the final fastened state, a very strong tensile force acts on the nut against the first direction. The part of the internally threaded portion that is passed through the opening and protrudes beyond the fastening portion thus advantageously forms an abutment for the support surface of the compensation element.

In a further advantageous embodiment of the invention, the nut has a retaining element which is designed to prevent the nut from moving out of the opening in the first direction when a force acts on the nut in the first direction, in particular up to a predetermined maximum active force. This provides an additional safety mechanism which prevents the nut from being moved downwards, namely in the screwing direction or in the first direction, out of the opening, when the screw is screwed in. Such a fixing option provided by the retaining element can be provided in a wide variety of ways, for example again as a mechanical retaining element, for example a tilting mechanism or latching mechanism or the like.

Furthermore, the invention also relates to a battery for a motor vehicle having a tolerance compensation arrangement according to the invention or one of its configurations. As already described, the invention has particularly great advantages when used within a battery. It is preferred that the battery has a battery housing and at least one battery module arranged on the battery housing, which comprises a module housing and a plurality of battery cells accommodated in the module housing, the module housing representing the first component and the battery housing representing the second component.

The battery can therefore be configured as a high-voltage battery for the motor vehicle. The battery cells can be lithium-ion cells, for example. It is particularly advantageous if the battery cells are in the form of prismatic battery cells, for example. These can be combined into a cell pack in which several battery cells are arranged next to one another in a specific arrangement direction. This cell pack can accordingly be arranged in a module housing. The module housing can also be provided, for example, only by a frame surrounding the cell pack. Optionally, the module housing can also have a module bottom. The arrangement direction of the cells in the cell pack is preferably perpendicular to the first direction. The module housing can be provided by a clamping frame with end plates, which delimit the cell pack in its longitudinal direction or in the direction in which the cells are arranged. These end plates can accordingly provide the first fastening portion. In particular, a respective end plate can even provide two fastening portions. In other words, a battery module can be fastened to the battery housing via four tolerance compensation units and corresponding nuts arranged on the battery housing. The tolerance compensation units can be arranged correspondingly in the four corner regions of such a battery module. The battery housing accordingly provides the corresponding second fastening portions. These can be provided, for example, as flanges on the partition walls or, for example, also be provided by a housing bottom itself.

A motor vehicle with a battery according to the invention or one of its configurations should also be regarded as belonging to the invention.

The motor vehicle according to the invention is preferably embodied as an automobile, in particular as a passenger car or truck, or as a passenger bus or motorcycle.

Furthermore, the invention also relates to a method for providing tolerance compensation when fastening a first component to a second component, wherein the first component is provided with a tolerance compensation unit fastened to the first component, which unit has a base element which is fastened to the first component and a compensation element with a support surface, which compensation element can be accommodated in the base element and the position of which can be adjusted relative to the base element with respect to a first direction. Furthermore, a screw neck of a certain screw is passed through a first through-opening extending in the first direction through the base element and through the compensation element accommodated in the base element, and the screw is rotated to fasten the first component to the second component, whereby the compensation element is moved relative to the base element with respect to the first direction in such a way that a distance between the base element and the support surface of the compensation element is increased. The screw is screwed into a nut separate from the tolerance compensation unit and which is fastened to the second component, in a screwing-in direction, that corresponds to the first direction in which the compensation element is moved relative to the base element during screwing.

The advantages described for the tolerance compensation arrangement according to the invention and its configurations thus apply similarly to the method according to the invention.

The invention also includes refinements of the method according to the invention, which have the same features already described in conjunction with the refinements of the tolerance compensation arrangement according to the invention. For this reason, the corresponding refinements of the method according to the invention are not described again here.

The invention also comprises combinations of the features of the described embodiments. The invention also includes implementations that each have a combination of the features of several of the described embodiments, unless the embodiments were described as mutually exclusive.

BRIEF DESCRIPTION OF THE FIGURES

Exemplary embodiments of the invention are described hereinafter. In the figures.

DETAILED DESCRIPTION

Figure 1:
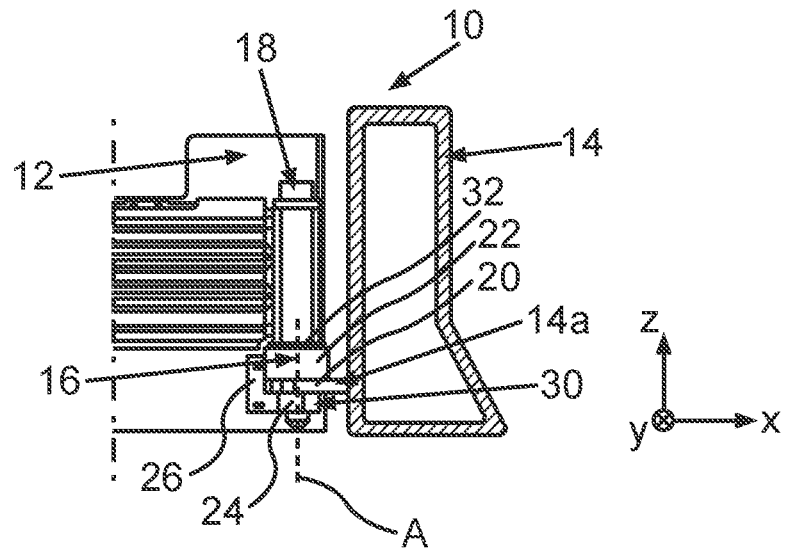
FIG. 1 shows a schematic representation of a component arrangement with a tolerance compensation system according to an example not belonging to the invention.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, the same reference numerals designate elements that have the same function.

FIG. 1 shows a schematic representation of a component assembly 10 with a battery module 12 and a battery housing 14, as well as with a tolerance compensation system 16 according to an example not belonging to the invention. In this example, the battery housing 14, more precisely a side wall or partition wall of the battery housing 14, comprises a fastening flange 14a to which the battery module 12 is to be screwed tightly by means of a battery module screw 18. Since battery modules 12 should preferably be in direct contact with a cooling bottom, the battery modules 12 of a battery are usually at different heights relative to the housing 14 due to tolerances. To compensate for these height differences, tolerance compensation systems 16 are used. The tolerance compensation system 16 has a gap 20 which separates an upper part 22 from a lower part 24 of the tolerance compensation system 16. The upper part 22 and the lower part 24 are connected to one another by a web 26. The gap 20 allows the tolerance compensation system 16 to be slid onto the flange 14a. The web 26 runs parallel to or in a direction of an axis of rotation A of the tolerance compensation system 16. Furthermore, the tolerance compensation system 16 has a through-opening along this axis of rotation A, through which a screw 18 can be passed or screwed. A press nut 30 can be accommodated in the lower part 24. Furthermore, in this example shown, the upper part 22 of the tolerance compensation system 16 is designed in several parts and in particular has an inner part and an outlying part, namely an outer part. The inner part is screwed into the outer part or can be unscrewed or rotated out of it. By unscrewing this inner part, the height of the tolerance compensation system 16 increases in the direction of its axis of rotation A. The tolerance compensation is produced by this height variation. This inner part is unscrewed by screwing the screw 18 through the through-opening and into the press nut 30. As a result, a plate 32 as part of the inner part is unscrewed upwards, namely in the z-direction and against the screwing-in direction, until it comes to rest on the battery module 12.

However, the design of the tolerance compensation system described above requires a relatively large amount of installation space and consequently does not allow particularly large support surfaces, which in turn limits the biasing forces. This can now advantageously be avoided by the invention and its embodiments.

Figure 2:
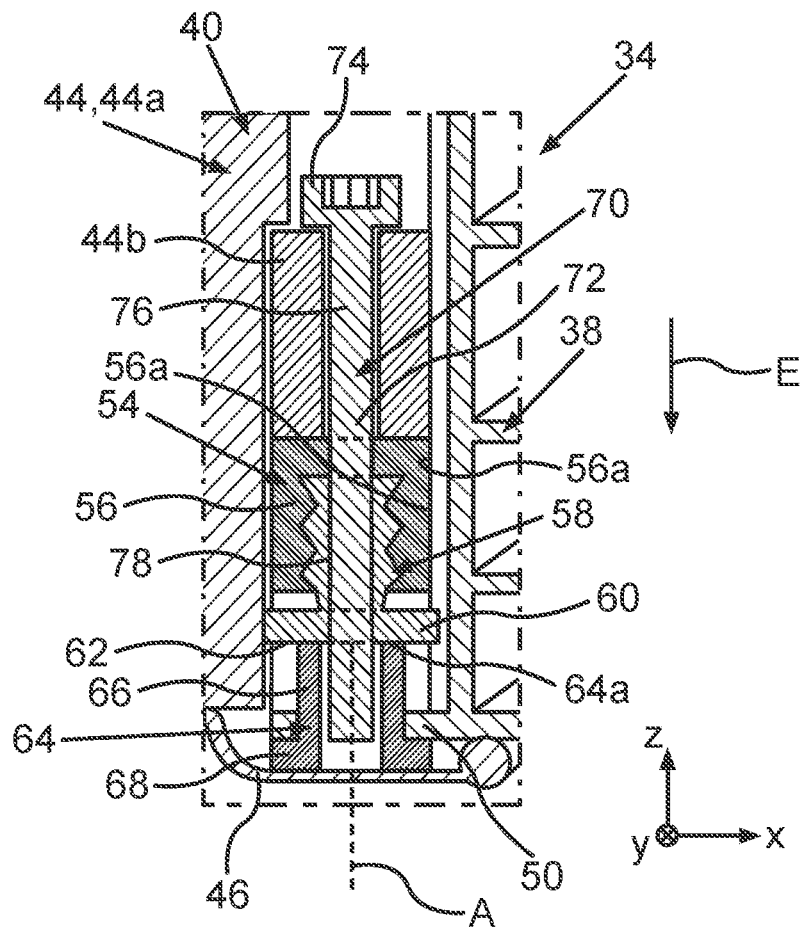
FIG. 2 shows a schematic representation of a tolerance compensation arrangement according to an exemplary embodiment of the invention.
Figure 3:
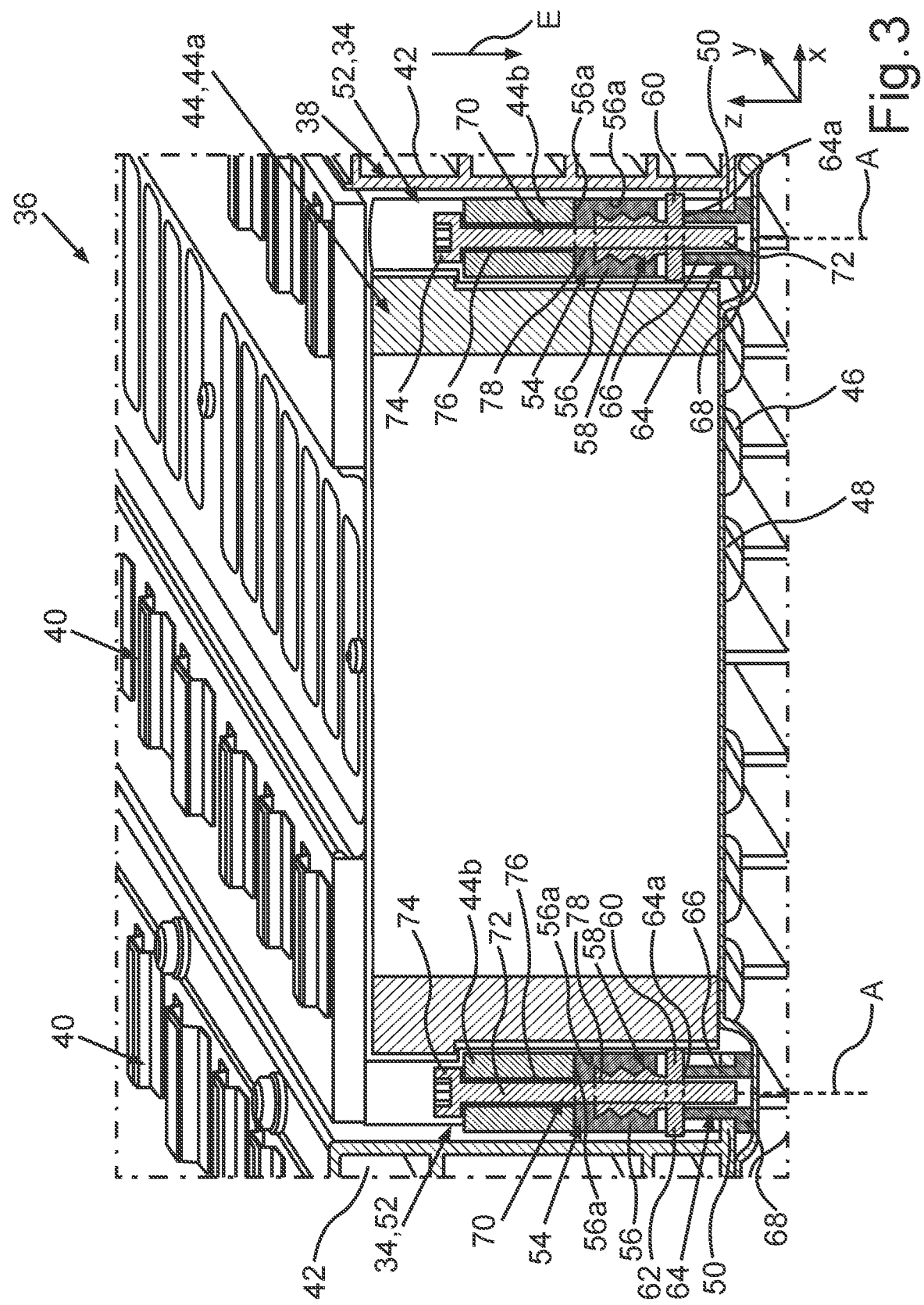
FIG. 3 shows a schematic illustration of a battery for a motor vehicle having a tolerance compensation arrangement according to an exemplary embodiment of the invention.

FIG. 2 shows a schematic representation of a tolerance compensation arrangement 34 according to an exemplary embodiment of the invention. FIG. 2 shows a detailed view of part of the battery shown schematically in FIG. 3, which in this example is embodied as a high-voltage battery 36 according to an exemplary embodiment of the invention. Such a battery 36 has a battery housing 38 and a plurality of battery modules 40. A respective battery module 40 in turn comprises a plurality of battery cells which are not explicitly shown here. These are in turn arranged within a module housing 44. Of this module housing 44, an end plate 44a is shown in particular, which delimits the battery module 40 in the y-direction. The battery housing 38 also has a plurality of receiving regions in which the respective battery modules 40 can be accommodated. These can be delimited laterally by side walls 42. These side walls 42 separate receiving regions from one another or one receiving region from a region surrounding the battery 36. Each receiving region is delimited on the underside by a housing bottom 46, which is also designed as a cooling bottom 46 and has cooling channels 48 through which a coolant can flow. In order to fasten the battery module 40 to the battery housing 38, the housing 38 has a fastening flange 50. In this example, this is provided as part of a side wall 42. In this case, this fastening flange 50 can also be located at any height with respect to the z-direction above the housing bottom 46 or, as shown here, it can also be arranged at the height of the housing bottom 46 itself. The battery module 40 can also be fastened to the housing 38 at a plurality of connection points. Two such fastening regions 52 are shown in this example. In this case, each of these fastening regions 52 has a tolerance compensation arrangement 34 according to an exemplary embodiment of the invention. In this case, one fastening portion 44b per fastening region 52 is provided integrally with the end plate 44a of the module housing 44. This fastening portion 44b thus represents part of the battery module 40, in particular of the module housing 44. The tolerance compensation arrangement 34 will now be explained in more detail with reference to FIG. 2.

The tolerance compensation arrangement 34 has a tolerance compensation unit 54. This unit is arranged on the battery module 40, in particular on the module housing 44, more precisely on the fastening portion 44b. In this case, the tolerance compensation unit 54 is preassembled on the battery module 40, in particular before the battery module 40 is inserted into the battery housing 38 in the course of assembling the battery 36. This pre-assembly of the tolerance compensation unit 54 can take place in a wide variety of ways, for example by screwing of the outer cage 56, which is also referred to here as the base element 56, by pressing in or other fixing options. In the present example, the base element 56 has fastening surfaces 56a which are arranged on the module housing 44, including, for example, a fastening surface 56a which is fastened to the fastening portion 44b of the module housing 44 of the battery module 40, for example by means of one of the fastening options already described.

In principle, it is also conceivable that the fastening portion 44b shown here is not part of the module housing 44, but is formed integrally with the base element 56 and thus, for example, represents part of the base element 56 itself, while another part of the module housing 44 then acts as a fastening portion, on which the base element 56 is preassembled.

In addition to the base element 56, the tolerance compensation unit 54 also has a compensation element 58 with a plate 60 for providing a support surface 62. This compensation element 58 can be moved relative to the base element 56, specifically with respect to the z-direction. In particular, the compensation element 58 can be unscrewed with respect to the base element 56, specifically in a direction opposite to the z-direction shown. If the compensation element 58 is unscrewed, the distance between the support surface 62 and the base element 56 increases. Moreover the tolerance compensation arrangement 34 comprises a nut 64, which in this example, is provided as a press nut 64. This nut is accordingly fastened to the flange 50, in particular rigidly fastened, that is to say also arranged in a rotationally fixed manner. In this example, the nut 64 accordingly comprises a threaded portion 66 with an internal thread not shown in detail here, and a flange portion 68 which is widened in a direction perpendicular to the z-direction with respect to the internally threaded portion 66. The flange 50 includes a through-opening, through which the nut 64 is partially pushed in, so that the flange portion 68 of the nut 64 comes to rest with its underside on this flange 50 of the housing 38. In addition, a retaining device (not shown in detail here) can also be provided or other measures can be taken that ensure that the nut 64 cannot be punched out downwards. Before the battery module 40 with the tolerance compensation unit 54 arranged on it or also a plurality of tolerance compensation units 54 pre-assembled on the battery module 40, depending on the number of desired fastening regions 52, is inserted into the battery housing 38, this battery housing 38 is provided with above said press nut 64. Before insertion, a thermally conductive medium, which is also not shown in detail here, for example a gap filler or a heat pad, is applied or fastened to the housing bottom 46. The battery module 40, including the preassembled tolerance compensation elements, which are referred to here as a tolerance compensation unit 54, and which are arranged in the screwing points, namely in the fastening regions 52, is then placed in the battery housing 38. The battery module 40 is pressed on the housing base by means of a gripper 46 and held in place. The automated system then locks the battery module screws 70, namely one per tolerance compensation unit 54. In the course of such locking, a screw 70, which comprises a screw neck 72 and a screw head 74, is inserted with its screw neck 72 by means of a translational movement against the z direction through a through-opening 76 in the fastening portion 44*b* and through a further through-opening 78 in the tolerance compensation unit 54 until the end of the screw 70 opposite the screw head 74 reaches the nut 64. The screw neck 72 is provided with an external thread which corresponds to the internal thread of the nut 64. The screw 70 is thus inserted so far that it penetrates the tolerance compensation element, i.e. the tolerance compensation unit 54, which is provided with an inner opening 78, until it hits the press nut 64. There the screw system begins to rotate and the screw 70 screws into the press nut 64. In other words, the screw 70 is now screwed into the press nut 64 by rotating it using a screw system. The screwing-in direction is denoted by E in the present case and is directed against the z-direction shown. As a result of the screwing movement of screw 70, the plate 60 of compensation element 58 also moves downwards until it reaches the edge 64*a* of the press nut 64. The tolerance compensation unit 54 can have a driver unit (not shown here), which, for example, transmits, through frictional coupling, a torque of the screw 70 to the compensation element 58, when it is screwed into the nut 64, in order to rotate this in the same direction when the screw rotates about the axis A on the compensation element 58, in order to unscrew it accordingly from the base element 56 in a downwards direction, namely in the screwing-in direction E. When the plate 60 comes to rest on the nut 64, as shown in FIG. 2, a hard joint is formed, in particular before the screw head touches the module 40. Finally, the screw is tightened down to a defined torque forming a fixed joint between the housing 38 and the battery module 40 including the heat-conducting medium.

The functional principle of this tolerance compensation arrangement 34 is, so to speak, inverted compared to previous systems. In order to provide the tolerance compensation, the plate 60 is in particular lowered relative to the base element 56 in the same direction, in which the screw 70 also moves when screwed in. This plate 60 is then supported on the press nut 64 which is pressed into the housing flange 50. As a result, significantly larger contact surfaces can be provided, as a result of which significantly larger biasing forces can be implemented.

By means of such a tolerance compensation arrangement 34, two components can be thus connected to one another in an efficient and stable manner and at the same time a tolerance compensation can be provided between these components, wherein the first component is the battery module 40 of a battery 36 and the second component represents the battery housing 38 of the battery 36. Nevertheless, such a tolerance compensation arrangement 34 can also be used at any other location, in particular also outside of a battery or the motor vehicle, where two components are to be connected to one another while providing tolerance compensation.

Overall, the examples show how the invention can be used to provide a tolerance compensation system that can be screwed out, preferably between the battery module and the battery housing, which can be preassembled in the module and allows tolerance compensation with high biasing forces, that is particularly efficient in terms of installation space.

The invention claimed is:

1. A tolerance compensation arrangement for tolerance compensation between a first component and a second component to be fastened to the first component, the tolerance compensation arrangement having a tolerance compensation unit comprising:
    a base element for fastening to the first component;
    a compensation element with a support surface, which can be accommodated in the base element and a position of which relative to the base element can be adjusted with respect to a first direction,
    a first through-opening extending in the first direction through the base element and through the compensation element accommodated in the base element, through which a screw neck of a specific screw can be passed,
    wherein the tolerance compensation unit is designed in such a way that rotating the specific screw with its screw neck passing through the first through-opening causes the compensation element to move relative to the base element with respect to the first direction, so that a distance between the base element and the support surface of the compensation element is increased;
    wherein the tolerance compensation arrangement has a nut, which is separate from the tolerance compensation unit, for fastening to the second component, and into which the specific screw can be screwed, wherein the tolerance compensation unit is designed in such a way that by screwing-in the specific screw, which has its screw neck passed through the first through-opening of the tolerance compensation unit, into the nut in a screwing-in direction that corresponds to the first direction, the compensation element can also be moved in the first direction relative to the base element,
    wherein the tolerance compensation arrangement comprises the first component, which has a first fastening portion with a first side and a second side opposite the first side with respect to the first direction and a second through-opening from the first side to second side having a first diameter that is smaller than a second diameter of a screw head, wherein the base element is arranged on the second side of the fastening portion, and the screw can be inserted, with its screw neck, through the second through-opening of the first fastening portion and through the first through-opening of the tolerance compensation unit without a rotating movement, so that the first fastening portion is located between the screw head and the tolerance compensation unit.

2. The tolerance compensation arrangement of claim 1, wherein the tolerance compensation arrangement is designed in such a way that when the screw, the neck of which is passed through the first through-opening of the tolerance compensation unit, is screwed into the nut, the compensation element is movable relative to the base element in the first direction until the support surface of the compensation element reaches an abutment, which is provided by the nut.

3. The tolerance compensation arrangement of claim 1, wherein the tolerance compensation arrangement comprises the specific screw, which comprises the screw neck with an external thread and the screw head which is widened in relation to the screw neck.

4. The tolerance compensation arrangement of claim 1, wherein the tolerance compensation arrangement comprises the second component, which has a second fastening portion, to which the nut is fastened, so that the screw, the screw neck of which passes through the first and second through-opening, can be screwed into the nut.

5. The tolerance compensation arrangement of claim 1, wherein the nut is designed as a nut which is pressed into the second fastening portion.

6. The tolerance compensation arrangement of claim 1, wherein the nut has an internal thread portion with an internal thread and a flange portion directly adjoining the internal thread portion in the first direction and having an external geometry that is wider than the internal thread portion, wherein the second fastening portion has an opening into which the nut is pressed in such a way that the flange portion is brought to rest on a side of the second fastening portion facing away from the tolerance compensation unit, and a part of the internal thread portion is passed through the opening and protrudes against the first direction beyond the second fastening portion.

7. The tolerance compensation arrangement of claim 1, wherein the nut has a retaining element which is adapted to prevent the nut from moving out of the opening of the second fastening portion in the first direction by applying a force onto the nut in the first direction up to a predetermined maximum active force.

8. A battery for a motor vehicle having the tolerance compensation arrangement of claim 1, wherein the battery comprises:
a battery housing; and
at least one battery module which is arranged in the battery housing and comprises a module housing and several battery cells accommodated in the module housing, wherein the module housing represents the first component and the battery housing represents the second component.

9. The tolerance compensation arrangement of claim 2, wherein the tolerance compensation arrangement comprises the specific screw, which comprises the screw neck with an external thread and the screw head which is widened in relation to the screw neck.

10. The tolerance compensation arrangement of claim 2, wherein the tolerance compensation arrangement comprises the second component, which has a second fastening portion, to which the nut is fastened, so that the screw, the screw neck of which passes through the first and second through-opening, can be screwed into the nut.

11. The tolerance compensation arrangement of claim 3, wherein the tolerance compensation arrangement comprises the second component, which has a second fastening portion, to which the nut is fastened, so that the screw, the screw neck of which passes through the first and second through-opening, can be screwed into the nut.

12. The tolerance compensation arrangement of claim 2, wherein the nut is designed as a nut which is pressed into the second fastening portion.

13. The tolerance compensation arrangement of claim 3, wherein the nut is designed as a nut which is pressed into the second fastening portion.

14. The tolerance compensation arrangement of claim 4, wherein the nut is designed as a nut which is pressed into the second fastening portion.

15. A method for providing tolerance compensation when fastening a first component to a second component, comprising:
providing the first component with a tolerance compensation unit fastened to the first component, which has a base element which is fastened to the first component and a compensation element with a support surface which can be accommodated in the base element;
adjusting the position relative to the base element with respect to a first direction;
passing a screw neck of a specific screw through a first through-opening extending in the first direction through the base element and through the compensation element accommodated in the base element;
rotating the screw for fastening the first component to the second component;
moving the compensation element is moved relative to the base element with respect to the first direction in such a way that a distance between the base element and the support surface of the compensation element is increased;
screwing the specific screw by its rotation into a nut which is separate from the tolerance compensation unit and is fastened to the second component, in a screwing-in direction (E), that corresponds to the first direction, in which the compensation element is moved during the screwing relative to the base element,
wherein the tolerance compensation arrangement comprises the first component, which has a first fastening portion with a first side and a second side opposite the first side with respect to the first direction and a second through-opening from the first side to second side having a first diameter that is smaller than a second diameter of the screw head, wherein the base element is arranged on the second side of the fastening portion; and
inserting the screw, with its screw neck, through the second through-opening of the first fastening portion and through the first through-opening of the tolerance compensation unit without a rotating movement, so that the first fastening portion is located between the screw head and the tolerance compensation unit.

* * * * *